May 29, 1951  W. A. HAGERBAUMER  2,555,129
CATALYST CONTROL SLIDE VALVE
Filed Feb. 10, 1948  3 Sheets-Sheet 1

INVENTOR.
WILLIAM A. HAGERBAUMER
BY
AGENT OR ATTORNEY

May 29, 1951 W. A. HAGERBAUMER 2,555,129
CATALYST CONTROL SLIDE VALVE
Filed Feb. 10, 1948 3 Sheets-Sheet 3

INVENTOR.
WILLIAM A. HAGERBAUMER
BY
AGENT OR ATTORNEY

Patented May 29, 1951

2,555,129

UNITED STATES PATENT OFFICE 2,555,129

CATALYST CONTROL SLIDE VALVE

William A. Hagerbaumer, Westfield, N. J., assignor to Socony-Vacuum Oil Company, Incorporated, a corporation of New York Application February 10, 1948, Serial No. 7,471

3 Claims. (Cl. 23—288)

This invention is concerned with the handling of a moving bed of solid particles in a continuous, catalytic process. It is more particularly concerned with the handling of solid catalyst in a continuous hydrocarbon conversion process.

It has been necessary to continually increase the percentage of gasoline produced from each barrel of crude petroleum oil to meet the unprecedented demand caused by the wide acceptance of the gasoline engine as a source of power, particularly in the automotive, truck, bus and aircraft fields. To meet the growing demand, refiners developed the hydrocarbon cracking art, whereby heavy distillates, subjected to high temperature and pressure, are cracked to products, boiling in the gasoline range, suitable for use in gasoline engines. In the development of the art, catalysts were found which made it possible to conduct the cracking reactions at low pressure and reduced temperatures.

Early catalytic hydrocarbon cracking was conducted batchwise. The process was on stream until the catalyst was spent sufficiently to make continuation of the process uneconomical. The catalyst was then regenerated in place by burning the deposits from the surface of the catalyst.

The catalytic cracking process has recently been made continuous by maintaining a solid descending column of particle-form solid catalyst in a reactor to which the catalyst is supplied at the top and from which catalyst is withdrawn at the bottom, the catalyst descending through the reaction zone under the influence of gravity. A separate regeneration zone is utilized to continuously revivify the spent catalyst. In one favored system, preheated hydrocarbons, usually in the vapor stage, are fed into the bottom of the reactor. This vapor passing upwardly through the reactor, is brought into intimate contact with the descending catalyst particles. The cracked distillates are withdrawn from the reactor at the top and the spent catalyst particles are removed at the bottom. The spent catalyst particles flow by gravity through a conduit to the bottom of an elevator. The particles are lifted by the elevator and conducted through a conduit to a regenerator in which they are revivified. The revivified catalyst particles pass from the regenerator and are conducted through a conduit to the bottom of another elevator, wherein they are transported to the top of a catalyst storage hopper. The particles pass through the hopper and into the reactor to complete the closed cycle of operations.

Various emergencies arise in the operation of such continuous catalytic cracking processes that require the sealing of the outlet of the reactor or regenerator to prevent the flow of catalyst from either or both of these units. It is desirable, furthermore, that the closure be capable of making a reasonably tight vapor seal.

It is an object of this invention to provide closure means at the outlet of a vessel containing particle-form material.

It is a further object of this invention to provide closure means in the catalyst circulatory path of a continuous, catalytic cracking system.

It is a further object of this invention to provide closure means at the outlet of a continuous catalytic, cracking reactor or regenerator.

This invention will be described with reference to the attached drawings.

Figure 1:
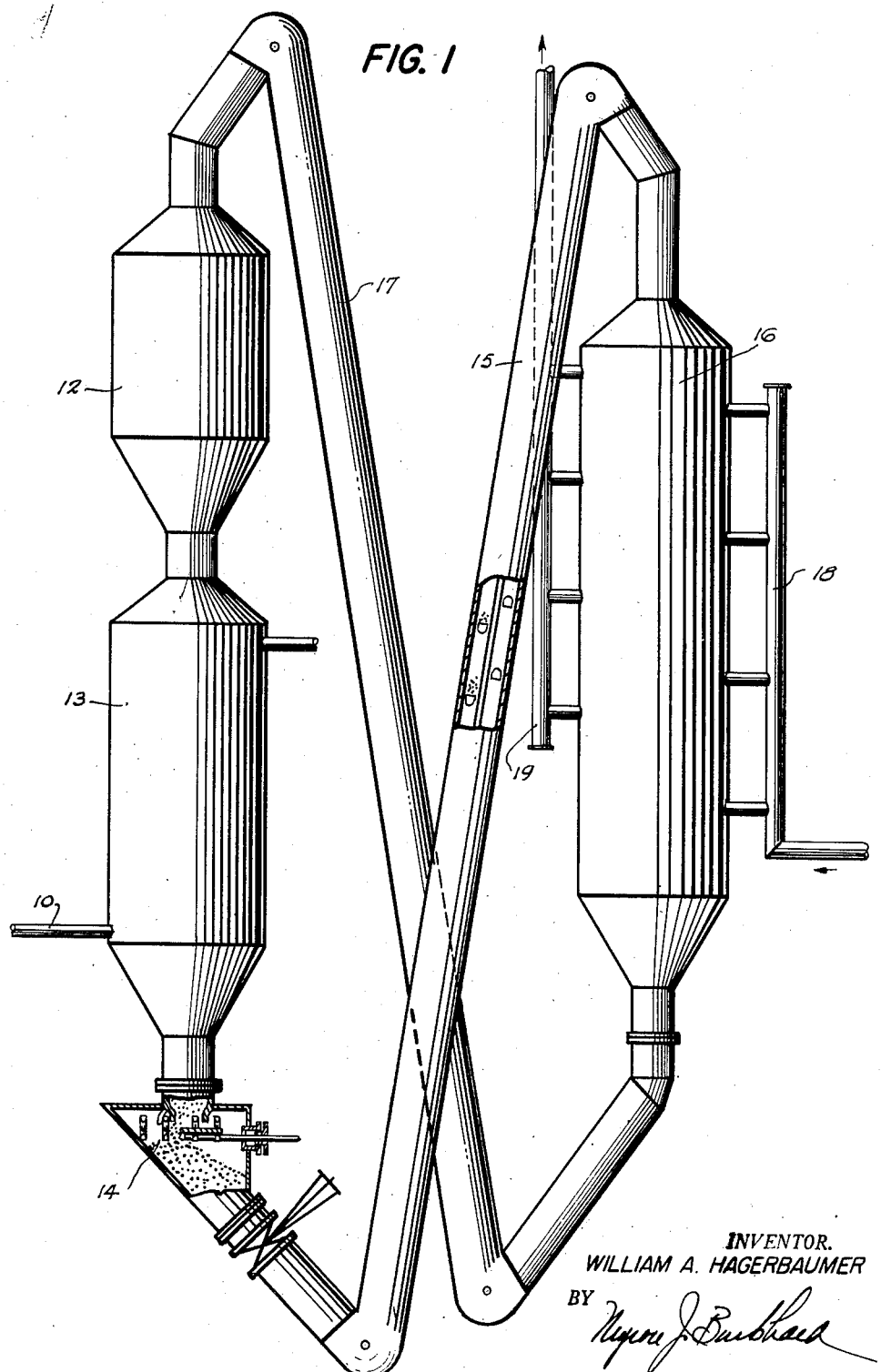
Figure 1 is a diagrammatic sketch of a continuous, catalytic cracking apparatus incorporating a slide, cut-off valve at the outlet of the reactor, a portion of which is sectioned.

Referring to Figure 1, a reacting vessel and a regenerating vessel, in conjunction with elevators for raising the catalyst, and the necessary catalyst connecting conduits to complete the system are shown. The vessels may be of any desired shape such as rectangular or circular cross section, with converging entrance and exit at top and bottom respectively.

Preheated hydrocarbon distillate, from a source not shown, is admitted to the reactor through pipe 10 and passes upwardly through the cracking zone. The cracked distillates are removed from the chamber through the pipe 11 and conducted to the remainder of the processing apparatus, not shown. The catalyst particles pass from the hopper 12, through the reactor 13, through the housing 14 to the bottom of the elevator 15. The details of a typical reactor and regenerator are described in the various patents on catalytic cracking of hydrocarbons of, for example, Payne, Simpson and Crowley such as No. 2,326,041, and need not be described in detail here. The catalyst is raised by elevator 17 to the top of a regenerator 16 through which it descends by the action of gravity, to the bottom of another elevator 17. Air is admitted to the regenerator through a header 18 wherein the catalyst is revivified. The flue gas is removed from the regenerator through the header 19. The revived catalyst is lifted by the elevator 17 to the catalyst storage hopper 12 atop the reactor 13.

Figure 2:
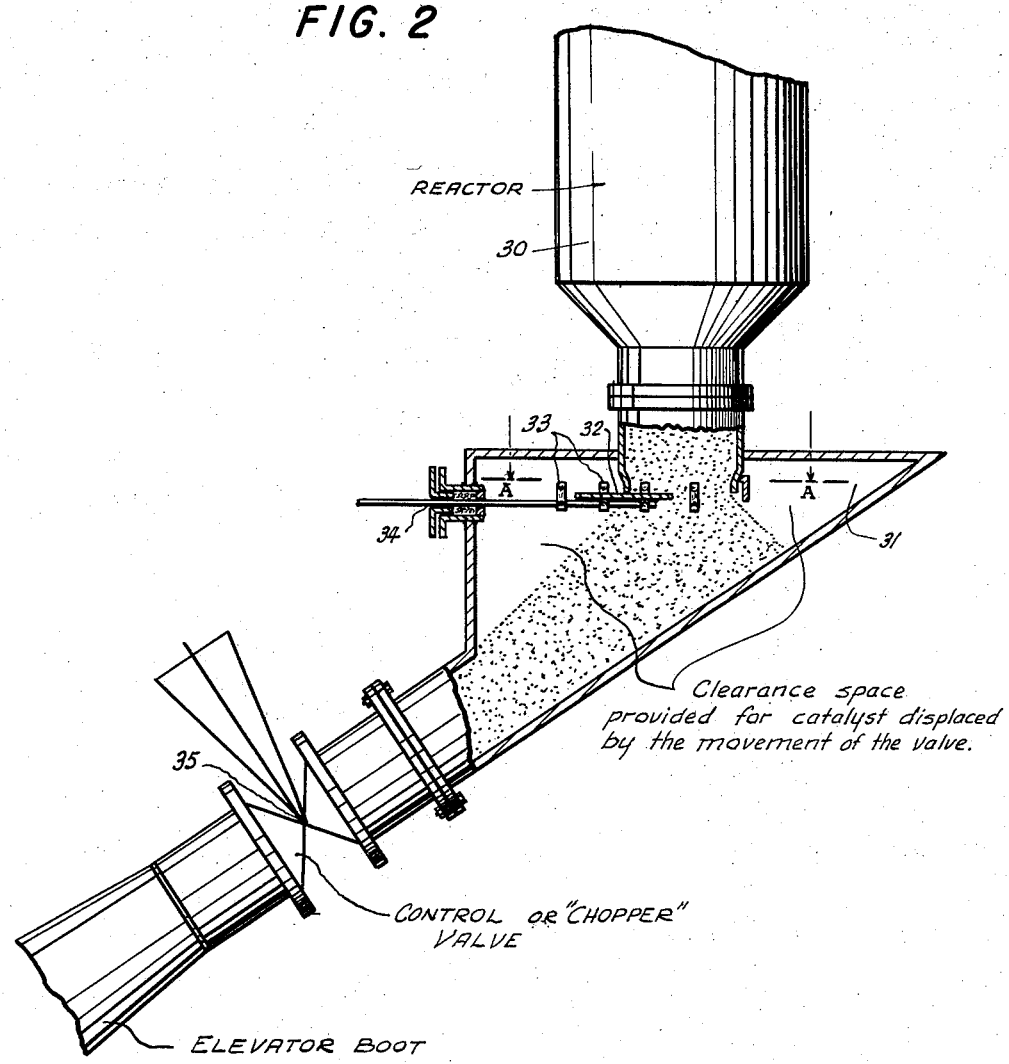
Figure 2 is a diagrammatic sketch of a portion of a continuous, catalytic cracking apparatus showing in section the location of the slide, cut-off valve.

The control or "chopper" valve 35, shown in Figure 2, a diagrammatic sketch of a portion of a continuous, catalytic cracking apparatus, is used to regulate the catalyst flow rate. In normal operation, the catalyst is piled up in back of the valve in the form of a solid column, extending through the conduit as shown, through the reactor, and on into the storage hopper atop the reactor; a solid column of particle size material, approximately sixty feet high. The catalyst particles usually have an average diameter of 2-4 mm. and are cylindrical, granular, or spherical in shape. In many respects, the catalyst follows the laws governing the flow of liquids, but unlike a liquid, the particles do not flow to fill a vessel, such as the conduit in Figure 2, flowing only until the angle of repose of the solid is reached.

The catalyst in the region of the reactor outlet is seen, therefore, to be a continuous column of particles. A slide valve for shut-off purposes at that location must possess unusual properties enabling it to push through the column and effect a closure. A valve operating in grooves or recesses will not function under these conditions. Such a valve would rapidly be clogged and jammed by the catalyst. Small catalyst particles and fines, being somewhat abrasive, would soon erode the mating metal parts making a tight seal impossible. Furthermore, the attrition of catalyst particles would be excessive.

In this invention a slide valve 20, located in a housing below the reactor, is designed to push aside a segment of the column of solid particles when moved to the closed position.

Figure 3:
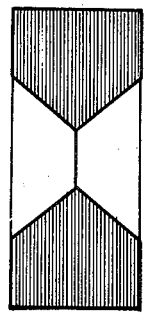
Figure 3 is a front view sketch of the line contact bearing used to support the slide valve.
Figure 4:
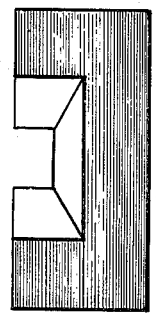
Figure 4 is a side view sketch of the line contact bearing used to support the slide valve.
Figure 5:
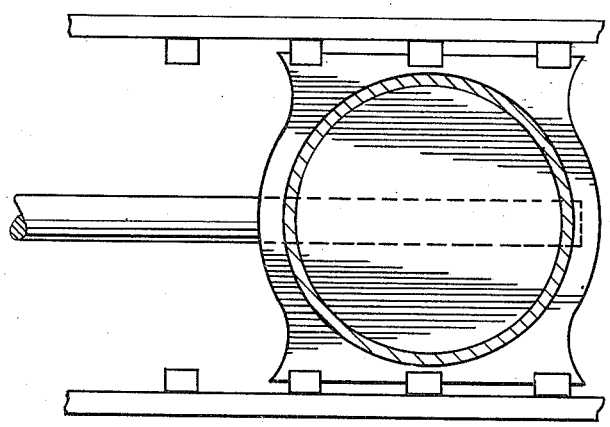
Figure 5 is a sectional view taken at section A—A of Figure 2 showing the slide valve and its support.

Referring again to Figure 2, which shows, in section, the location of the slide valve, catalyst descends through the reactor 30, into the housing 31, filling the housing in the manner indicated. As the valve plate 32 is shifted to the closed position, a portion of the catalyst is pushed aside, falling in the clearance space of the housing 31. The housing 31 is so shaped that, when the catalyst flow below the reactor outlet is not blocked or seriously impeded, the catalyst, displaced by the closing of the slide valve, is automatically returned to the catalyst stream. The clearance space is cleared, thereby, for a fresh supply of catalyst displaced by the valve upon subsequent closure. This feature automatically prevents the clearance space from being filled with dead catalyst which would interfere with the motion of the valve plate 32 or cause the valve to jam. The valve plate 32 is supported on line contact bearings 33 to minimize the sliding friction, and the tendency of the catalyst to pack between the moving valve and its stationary support. The line contact bearing used to support the slide valve is shown more clearly in Figures 3 and 4. A view looking downward upon the top of the slide valve, as seen through plane A—A of Figure 2, is shown in Figure 5 to more clearly demonstrate the method of supporting the valve in position.

Referring once again to Figure 2, the valve stem is projected through a packing in the wall of the housing, connected to the outlet of the reactor. The stem may be moved by a source of power, not shown, such as a hydraulic, or electrically driven ram, or even manually sledged to move the valve from the open to the closed position or vice versa.

Because there are no recesses in this design, there is little danger of catalyst packing, and therefore, an accurate fit can be maintained between the upper surface of the valve and the lower edge of the reactor outlet. This provides a relatively tight vapor seal when the valve is in the closed position.

I claim:

1. In a system handling a moving bed of particle-form material in which a compact column of said material is gravitated downwardly through a vertical vessel and out an outlet conduit located in the bottom of said vessel, the improvement which comprises a housing located below said vessel such that the outlet conduit of the vessel projects into the housing and terminates near the top, said housing defining an enclosed downwardly-directed path for the column of particle-form material discharged from said conduit, the cross-section of said housing in the region of said outlet conduit being substantially larger than the lower open end of said conduit, a valve plate located adjacent the outlet conduit adapted to slidably engage the edge of the conduit, the area of said valve plate being substantially larger than the area of the lower open end of said conduit, sharp-edged bearings located at substantially the same level as the outlet conduit at locations laterally displaced from said outlet conduit, said bearings adapted to support said plate and restrict it to reciprocating motion, said bearings all being located outside the region normally occupied by the compact column of particle-form material, and said bearings being so positioned that the valve plate makes a reasonably tight contact with the edge of said outlet conduit.

2. In a continuous catalytic cracking system for the conversion of hydrocarbons in which a particle-form contact material is gravitated downwardly as a continuous column through a reaction vessel in which said material is contacted with hydrocarbons at reaction conditions and gravitated downwardly through a regeneration vessel in which the material is contacted with a combustion supporting gas for removal of carbonaceous material formed on the contact material during conversion, the improvement which comprises closure means located below at least one of said vessels for preventing the flow of contact material and vapors therefrom, said means comprising: a downwardly-directed outlet conduit attached to the bottom of said vessel, a housing attached to said outlet conduit at a location above the free-end of said conduit, said housing defining an enlarged conduit means through which contact material discharged from said outlet conduit can gravitate, the cross-section of said housing in the region of said outlet conduit being substantially larger than the aperture of the conduit, a valve plate located inside said housing adapted to slidably engage the open end of said outlet conduit to close the conduit, said valve plate having an area substantially greater than the area of the conduit aperture, supporting bearings on each side of said valve plate for guiding the plate from the open to the closed position, said bearings being located outside the region normally occupied by said catalyst column and positioned to place the valve plate in tight contact with the lower edge of the conduit when the valve is closed, and means for reciprocating said valve plate.

3. In a continuous catalytic cracking system of hydrocarbons in which a particle-form contact material is gravitated downwardly as a continuous column through a reaction vessel in which said material is contacted with hydrocarbons at reaction conditions and gravitated downwardly through a regeneration vessel in which the material is contacted with a combustion supporting gas for removal of carbonaceous material formed on the material during conversion, the improvement which comprises closure means located below at least one of said vessels for preventing the flow of contact material and vapors therefrom, said means comprising a downwardly-directed outlet conduit attached to the bottom of said vessel, a housing attached to said outlet conduit at a location above the end of said conduit, said housing defining an enlarged conduit means through which contact material discharged from said outlet conduit can gravitate, the cross-section of said housing in the region of said outlet conduit being substantially larger than the conduit outlet, a valve plate located inside said housing adapted to slidably engage the open end of said outlet conduit to close the conduit, said valve plate having an area substantially larger than the area of the conduit outlet, sharp-edged bearings located along each side of said valve plate forming a guide for said plate, said bearings being located outside the region normally occupied by said catalyst column and positioned to place the valve plate in tight contact with the lower edge of the conduit when the valve is closed, and means for reciprocating said valve plate.

WILLIAM A. HAGERBAUMER.

REFERENCES CITED

The following references are of record in the file of this patent:

UNITED STATES PATENTS

| Number | Name | Date |
|---|---|---|
| 1,536,874 | Bates | May 5, 1925 |
| 2,410,309 | Simpson et al. | Oct. 29, 1946 |

OTHER REFERENCES

Murphree et al., "The Oil & Gas Journal," Mar. 3, 1945, pages 64, 67, 71, 72, 75, 79, 81.